US009616533B2

(12) United States Patent
Attucci et al.

(10) Patent No.: US 9,616,533 B2
(45) Date of Patent: Apr. 11, 2017

(54) INDUSTRIAL PLANT AND METHOD FOR THE PRODUCTION OF AN INDUSTRIAL PRODUCT, IN PARTICULAR AN AERONAUTICAL COMPONENT OR SYSTEM

(71) Applicant: ALENIA AERMACCHI S.P.A., Venegono Superiore (IT)

(72) Inventors: Francesco Attucci, San Vittore Olona (IT); Giuseppe Navarra, Mornago (IT); Franco Magri, Sangiano (IT); Renato Acquati, Rho (IT)

(73) Assignee: ALENIA AERMACCHI S.P.A., Venegono Superiore (VA) (IT)

( * ) Notice: Subject to any disclaimer, the term of this patent is extended or adjusted under 35 U.S.C. 154(b) by 0 days.

(21) Appl. No.: 14/896,892

(22) PCT Filed: May 9, 2013

(86) PCT No.: PCT/IB2013/053755
§ 371 (c)(1),
(2) Date: Dec. 8, 2015

(87) PCT Pub. No.: WO2013/168119
PCT Pub. Date: Nov. 14, 2013

(65) Prior Publication Data
US 2016/0151868 A1 Jun. 2, 2016

(30) Foreign Application Priority Data

May 9, 2012 (IT) .............................. TO2012A0415

(51) Int. Cl.
*G06F 7/00* (2006.01)
*B23P 21/00* (2006.01)
*B23P 19/00* (2006.01)

(52) U.S. Cl.
CPC ........... *B23P 21/004* (2013.01); *B23P 19/001* (2013.01); *B23P 2700/01* (2013.01)

(58) Field of Classification Search
None
See application file for complete search history.

(56) References Cited

U.S. PATENT DOCUMENTS 5,525,106 A 6/1996 Iizuka et al.
5,737,827 A * 4/1998 Kuse .................... B23P 19/001
29/701

(Continued)

FOREIGN PATENT DOCUMENTS

DE 1811635 A1 6/1970
DE 202004004620 U1 8/2004

(Continued)

OTHER PUBLICATIONS

International Search Report for corresponding International Patent Application No. PCT/IB2013/053755, mailed Sep. 16, 2013.

(Continued)

*Primary Examiner* — Yolanda Cumbess
(74) *Attorney, Agent, or Firm* — Merchant & Gould P.C.

(57) ABSTRACT

An industrial plant includes a plurality of first operating stations and a plurality of second operating stations, respectively placed at a first level (H1) and at a second higher level or height (H2). Each of the operating stations is adapted to carry out a production activity on the industrial product, at least one of the activities being one among a manufacturing, processing, forming, transforming and assembling activity of an industrial product. The plant includes a moving system configured to transport the industrial product, by lifting and/or lowering the industrial product from at least one of the first operating stations to at least one of the second operating stations. A central control system controls the moving system by automatically moving the industrial product between the operating stations as a function of a predetermined principle and based on the state of occupancy of the operating stations.

18 Claims, 4 Drawing Sheets

(56) References Cited

U.S. PATENT DOCUMENTS

| | | | | |
|---|---|---|---|---|
| 2006/0185143 | A1* | 8/2006 | Frauen | B23P 21/004 29/33 K |
| 2008/0289967 | A1* | 11/2008 | Owczarz | H01L 21/6723 205/157 |
| 2011/0047791 | A1* | 3/2011 | Ferenczi | B23P 21/004 29/791 |

FOREIGN PATENT DOCUMENTS

| | | |
|---|---|---|
| EP | 2221151 A2 | 8/2010 |
| FR | 2351032 A1 | 12/1977 |
| GB | 1544740 A | 4/1979 |
| JP | 58-143926 A | 8/1983 |
| JP | 60-167807 A | 8/1985 |
| JP | 62-63053 A | 3/1987 |
| JP | 5-185966 A | 7/1993 |
| JP | 5-294441 A | 11/1993 |
| JP | 6-143067 A | 5/1994 |
| WO | 2009004413 A1 | 1/2009 |

OTHER PUBLICATIONS

International Preliminary Report on Patentability for corresponding International Patent Application No. PCT/IB2013/053755, mailed May 19, 2014.

Written Opinion for corresponding International Patent Application No. PCT/IB2013/053755, mailed Sep. 16, 2013.

* cited by examiner

INDUSTRIAL PLANT AND METHOD FOR THE PRODUCTION OF AN INDUSTRIAL PRODUCT, IN PARTICULAR AN AERONAUTICAL COMPONENT OR SYSTEM

This application is a 371 National Stage Application of International Patent Application No. PCT/IB2013/053755, filed 9 May 2013, which claims benefit of Serial No. TO2012A000415, filed 9 May 2012 in Italy and which applications are incorporated herein by reference. To the extent appropriate, a claim of priority is made to each of the above disclosed applications.

TECHNICAL FIELD

The present invention is relative to an industrial plant and to a method for the production of an industrial product, in particular an aeronautical component or system.

TECHNOLOGICAL BACKGROUND

The use of industrial methods and plants for the production of an industrial product, in particular an aeronautical component or system, is widely known.

These methods and plants typically involve a plurality of operating stations, each of which is suited to perform, on an aeronautical component or system, a production activity, which can be a step to process, transform or assemble the component or system.

Though, said industrial methods and plants according to the prior art have some drawbacks.

One drawback consists in the fact that, especially in the aeronautical field, the operating stations and the production activities associated therewith are generally numerous and complex to be managed, in terms of handling, during a working process. As a matter of fact, the articles to be subject to processing are bulky and therefore difficult to move and deal with during their transportation through the operating stations of a production line. Generally, this aspect requires the operating stations to be arranged at a single level or working surface and the industrial products to be moved through the different operating stations by means of overhead cranes and/or slings.

Therefore, in order to perform the production method, in particular in the aeronautical field, there has to be a processing area that requires a free space extending, as a whole, in a horizontal direction; this condition leads to the drawback of necessarily having at one's disposal large industrial areas for the installation of the plants.

Secondly, the use of overhead cranes and slings often leads to difficulties in securing the plant. This drawback, in particular, is relative to the safety of those operators that manually handle the industrial products when they have to be fixed on the overhead cranes or slings.

According to the prior art, JP 62 063053 A describes a crane, which supports a vertically mobile lifting surface and it is suited to receive a semifinished product, a robotized apparatus being activated by a human operator standing on the lifting surface itself. The semifinished product is delivered to a numerical control tool machine by means of the robotized apparatus, so that said semifinished product is subject to processing. Subsequently, at the end of the processing step, the semifinished product is removed from the numerical control tool machine by means of the robotized apparatus. In this way, the operations are performed in a sequential manner and, therefore, the finished product is obtained at the end of the production cycle.

Nevertheless, the technical solution suggested by JP 62 063053 A requires the presence of a human operator on the lifting surface in order to act on the robotized apparatus, thus requiring a manual command or activation for the movement of the moving system associated with the semifinished product itself.

SUMMARY OF THE INVENTION

The object of the present invention is to provide a method and a plant that are able to solve these and other drawbacks of the prior art and that, at the same time, can be produced in a simple and economic manner.

The appended claims are an integral part of the technical teachings provided in the description with reference to the present invention.

BRIEF DESCRIPTION OF THE DRAWINGS

Further features and advantages of the present invention will be best understood upon perusal of the following detailed description, which is provided by way of example and is not limiting, with reference to the accompanying drawings, which specifically show what follows.

DETAILED DESCRIPTION OF THE INVENTION

Figure 1:
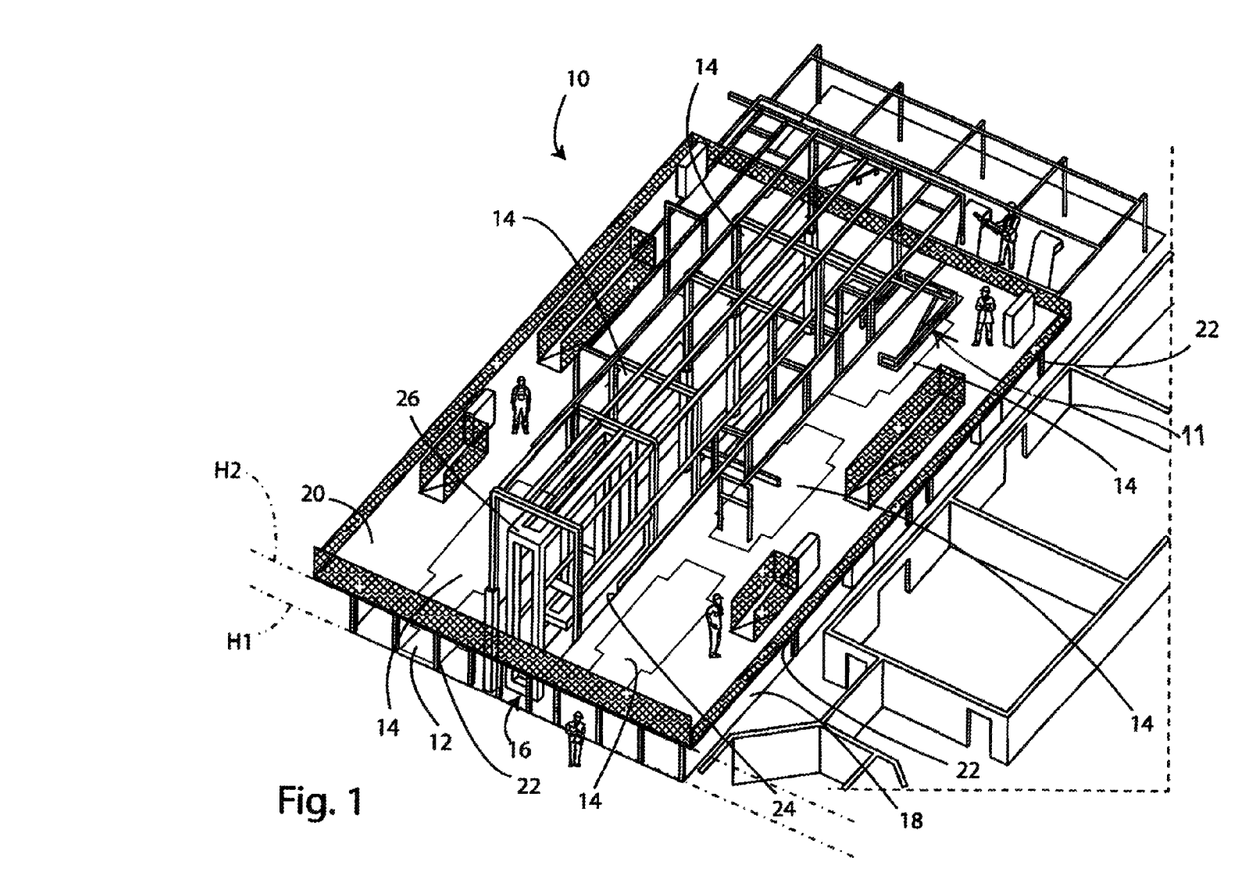
FIG. 1 is a prospective top view showing an industrial plant according to a first embodiment of the present invention.

With reference to FIG. 1, number 10 indicates, as a whole, an industrial plant according to an embodiment of the present invention. Plant 10 is suited to manufacture an industrial product, advantageously but not necessarily an aeronautical component or system, for example including a wing of an aircraft.

In particular, in the case of the wing of an aircraft, the industrial product comprises a semifinished product, which, at the end of the production cycle, will make up the finished wing and also includes a so-called jig, which consists of a substantially framework-like support element, for example shaped as a frame or as a tray, on which the semifinished product is fixed and supported during the transportation through the different operating stations (these details are not shown). In the aeronautical field, in particular, the use of the jig is advantageous, since it also provides a univocal reference system for the processing and assembling steps to which the semifinished product is subsequently subject in order to build the finished wing. Therefore, preferably, the industrial product always remains coupled to the relative jig until the end of the working process to which it is subject.

The industrial product is associated with a processing cycle or process, which includes a plurality of predetermined production activities. Please note that, by way of non limiting example, in FIG. 1 said jig is shown in a schematic manner and, in particular, forms a frame that is adapted to surround the industrial product while the working process is carried out, said jig being associated with reference number 11.

Figure 2:
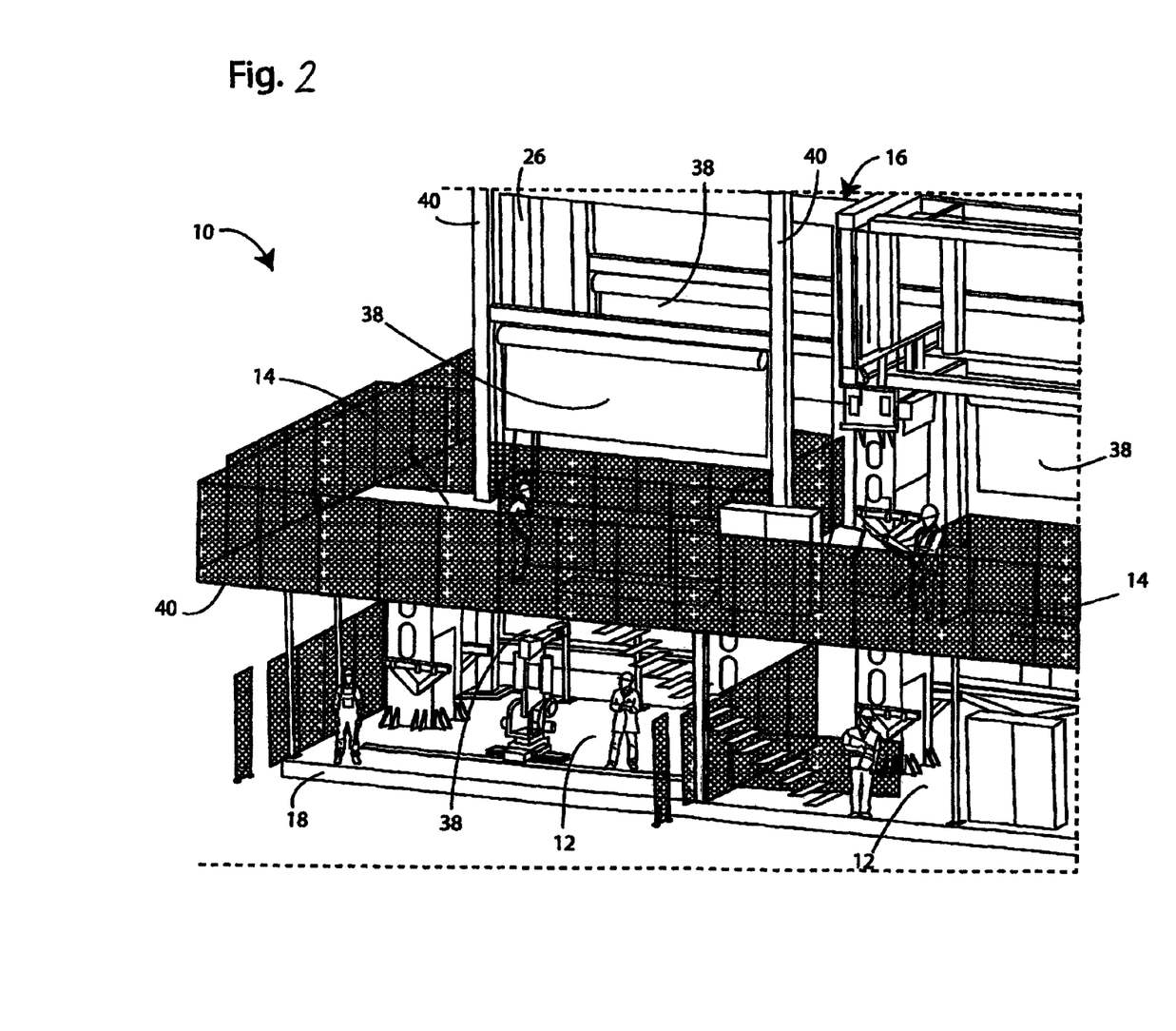
FIG. 2 is a partial lateral prospective view of the plant shown in FIG. 1.

As shown in FIGS. 1 and 2, plant 10 comprises a plurality of first operating stations 12, which are placed at a first level or height H1, and a plurality of second operating stations 14, which are placed at least at a second level or height H2, which is higher than said first level H1. Each one of said operating stations 12 and 14 is suited to carry out at least one of said production activities on said industrial product. In the embodiment shown, the first level H1 is substantially arranged at the height of the ground.

In the description and in the appended claims, the term "production activities" substantially indicates any kind of manufacturing, processing, forming, transforming, assembling and storing activities to which the industrial product can be subject during its working process. These activities can include, for example, a mechanical operation, a thermal treatment, the application of a coating, a chemical process, an assembly step, a temporary storage or the like. Preferably, operating stations 12 and 14 are suited to perform production activities for complex industrial products, for example production activities for a wing of an aircraft that is constrained on the jig and has to be moved through the different operating stations.

Furthermore, the term "production activity" can also indifferently refer to
completely automatized activities, and/or
activities that, in order to be performed, require the presence of one or more operators on the machines or tools that are suited to act on the industrial product during the working process, and/or
"mixed-type" activities comprising the two types of activities mentioned above.

Even though the working process can comprise one (or more) storing activities, according to the present invention at least one of the above-mentioned production activities is a manufacturing, processing, forming, transforming and assembling activity of the industrial product.

Therefore, the industrial product is adapted to move through different operating stations 12, 14 of plant 10 and remain there based on a predetermined order that is established as a function of the sequence of production activities defined by the working process to which said industrial product has to be subject.

Plant 10 comprises a moving system 16, which is configured to transport said industrial product, by lifting and/or lowering it, from at least one operating station 12 to at least one second operating station 14. Clearly, the first operating station 12 and the second operating station 14 can indifferently play the role of "departure" station, in which at least one previous production activity is performed, and the role of "arrival" station, in which at least one following production activity is performed. In other words, moving system 16 is built so as to equally transport the industrial product from a first station 12 to a second station 14 or from a second station 14 to a first station 12. Thanks to these features, plant 10 can also extend in a vertical direction with two or more working surfaces and, therefore, has a multi-level structure that takes up a reduced space in a horizontal direction.

Preferably, the first operating stations 12 are supported by a base working surface, for example a base platform 18, whereas the second operating stations 14 are supported by at least one higher working surface, for example a higher platform 20. In the embodiment shown, base platform 18 and higher platform 20 are separate and spaced apart by a plurality of support columns 22 (only some of them are numbered), which are vertically interposed between platforms 18, 20 themselves.

Optionally but advantageously, higher platform 20 and—if necessary—base platform 18 are provided with peripheral rails (not numbered), which are arranged in correspondence to at least one portion of the respective periphery.

Preferably, moving system 16 substantially operates in a manner similar to that of a stacker crane.

In the embodiment shown, the first operating station 12 are arranged in a pair of first rows (not numbered), between which moving system 16 is able to slide. Preferably, the second stations 14 are also arranged in a pair of second rows (not numbered), which are arranged in a corresponding manner above said first rows and between which moving system 16 is able to slide. In particular, the sliding movement of moving system 16 between the first and the second rows of operating stations 12, 14 substantially consists in a translation, which, for example, follows a straight line.

Preferably, close to the second operating stations 14, higher working surface 20 has a passage or longitudinal corridor 24, through which said moving system 16 is able to pass close to said second operating stations 14. In the embodiment shown, passage 24 is arranged between the second rows of the second operating stations, spacing them apart, and moving system 16 can slide therein in a guided manner.

In the embodiment shown, passage 24 has the shape of a slot or slit obtained on higher platform 20 and extending only along a portion of the latter. In other embodiments, the passage can be continuous and extends in a continuous manner through the higher working surface, thus creating a pair of lateral platforms, which are separate from one another and extend along opposite sides of the passage. If necessary, the lateral platforms can be arranged at different working heights.

Furthermore, moving system 16 comprises a support structure 26, which can slide in a guided manner on a guide rail (not numbered) of the mechanical or inductive type, which extends along operating stations 12. By way of example, the guide rail can extend between said first rows, thus laterally spacing them apart. The sliding movement of the support structure on the guide rail advantageously takes place by means of driving organs, for example of the electric type. In the embodiment shown, the guide rail extends on base platform 18 in a position corresponding to longitudinal passage 24, whereas support structure 26 extends—and can be moved, if necessary, in a guided manner—along said longitudinal passage 24.

Preferably, support structure 26 is configured as a framework or "skeleton" comprising, for example, a plurality of columns or uprights 27, which are connected to one another by a corresponding plurality of crosspieces 29.

Furthermore, moving system 16 comprises a transport assembly 28, which is indicated with number 28 and can vertically slide (for example by being lifted and lowered in a direction that is substantially orthogonal to platforms 16, 18) in a guided manner on support structure 26, so as to reach the different levels or working heights H1, H2. In the embodiment shown, the transport assembly 28 is mounted so as to slide in a guided manner on uprights 27, for example in a controlled manner by means of driving organs of the known type, which, for the sake of simplicity, are not shown. transport assembly 28, therefore, is suited to pick up, by being lowered and lifted, the industrial product and move it from at least one of said first operating stations 12 to at least one of said second operating stations 14.

In the embodiment shown, transport assembly 28 comprises a support element or board 30, which is suited to vertically move in a guided manner on support structure 26, and a pick-and-place assembly 32, which can be transversely moved in a guided manner on support element 30, for example by means of driving organs of the known type, which, for the sake of simplicity, are not shown.

Preferably, pick-and-place assembly 32 is able to extend on opposite sides of support element 30, thus sliding from one side to the other of the latter, so as to be able to pick up and deliver an industrial product in correspondence to operating stations 12, 14 that can also be arranged on opposite sides of support structure 26 itself.

In more simple embodiments, pick-and-place assembly 32 can be configured so as to extend and operate on one single side of support element 30. For example, this can occur when the first operating stations 12 are arranged in a single first row and the second operating stations 14 are arranged in a single second row placed above said first row; in this way, pick-and-place assembly 32 can be arranged on the side of support element 30 that simultaneously faces the first and the second row of operating stations 12, 14.

In the embodiment shown, pick-and-place assembly 32 fulfills the task of picking up and delivering the industrial product, so as to move it from a first operating station 12 to a second operating station 14, which are arranged on base platform 18 and on higher platform 20 respectively.

According to further embodiments, pick-and-place assembly 32 can be configured so as to be mobile, in a guided manner, in any direction on a plane defined by support element 30, so as to be able to extend beyond the latter in the desired position, thus allowing a great flexibility and freedom in the movements performed to pick up and deliver the industrial product between different operating stations 12, 14.

For example, the pick-and-place assembly comprises a plurality of retractable forks 32, which are configured to transversely extend beyond support element 30, so as to be arranged under the industrial product to be supported during the movement. In the embodiment shown, each fork 32 comprises a plurality of segments 32*a*, 32*b* with an oblong shape, which can be extended in a controlled manner by means of driving means (not shown for the sake of simplicity) in a transverse direction with respect to the vertical direction of transport assembly 28. By way of example, segments 32*a*, 32*b* can have a tubular shape and can slide one on top of the other. In other embodiments, these segments can be configured in a telescopic manner. In the embodiment shown, segments 32*a*, 32*b* are two; though, retractable forks 32 can be used, which are provided with three or more segments. In particular, the first segment indicated with 32*a* is a base segment, which is mounted so as to transversely slide, in a guided manner, directly on support element 30, whereas the second segment indicated with 32*b* is an end segment 32*b*, which is mounted so as to transversely slide, in a guided manner, directly on base segment 32*a*. As shown in the figures, the sliding direction of the first and of the second segment 32*a*, 32*b* conveniently is the same.

Figure 3:
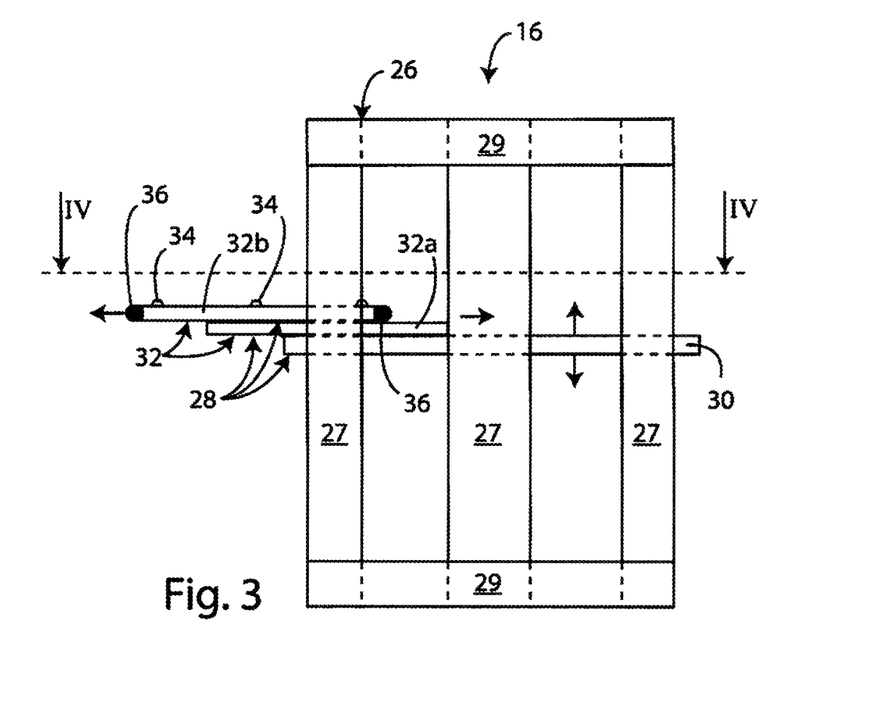
FIG. 3 is a schematic lateral view of a moving system of the industrial plant shown in the previous figures.
Figure 4:
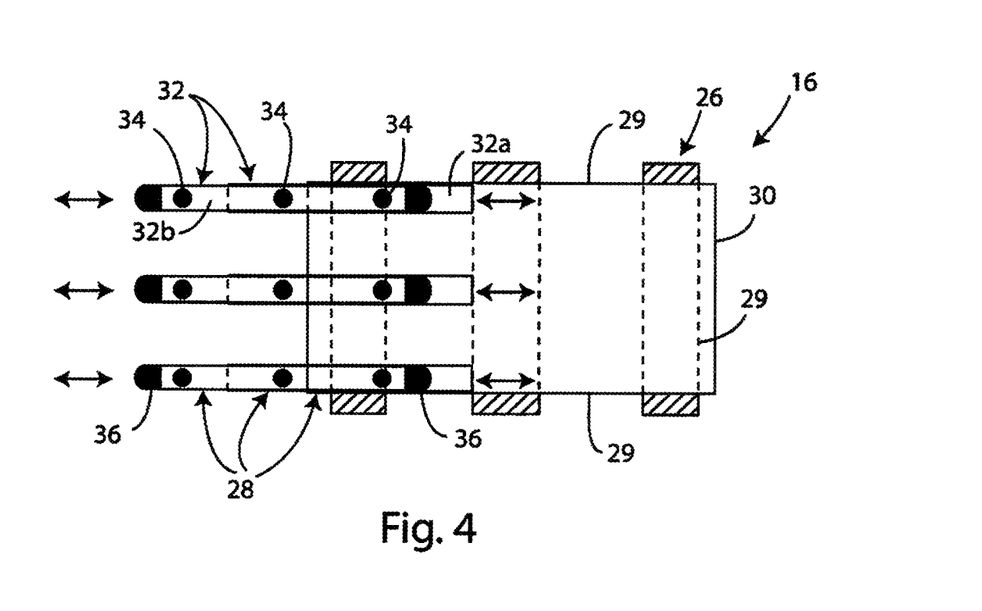
FIG. 4 is a section view of the moving system shown in FIG. 3 obtained through the section line IV-IV.
Figure 5:
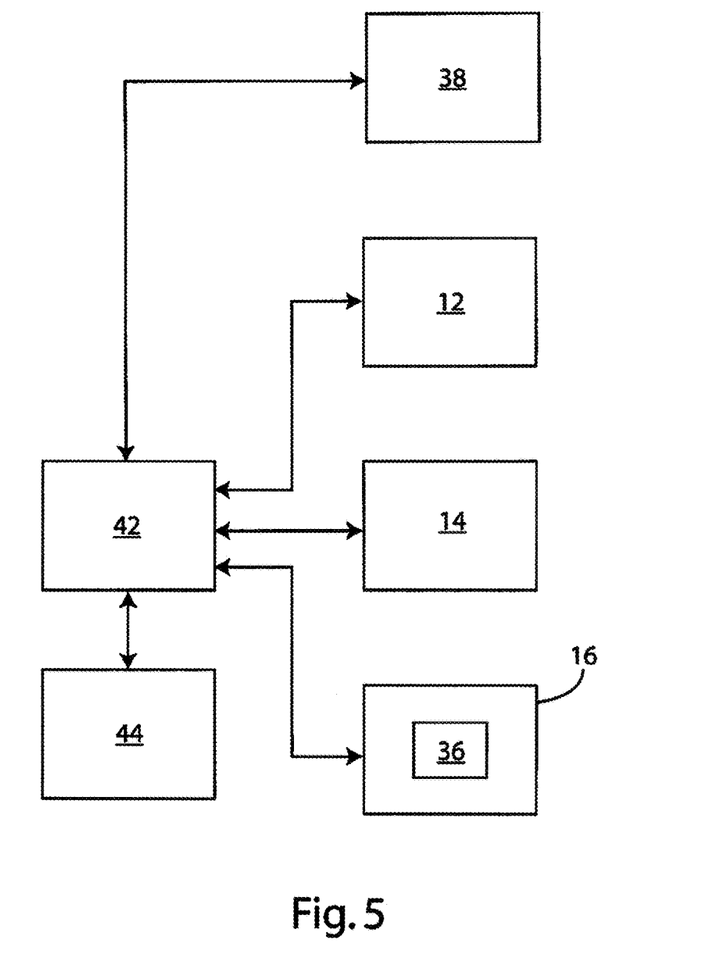
FIG. 5 is a flowchart representing the functional connections of the industrial plant shown in the previous figures.

Preferably, retractable forks 32 are of the bidirectional type or of the duel-inlet type, which means that they can be moved, in a guided manner, from one side to the other of support element 30, so that they are able to indifferently pick up and deliver the industrial product on one side or the other of the support structure 26. In FIGS. 3 and 4, retractable forks 32 are positioned in correspondence to a first side, arranged on the left, of support element 30 and can be moved so as to slide towards the opposite side, arranged on the right, in order to assume a configuration that is substantially symmetrical to the one shown.

Preferably, the pick-and-place assembly is provided with at least one abutment element 34, which is suited to be coupled to a respective engagement organ obtained in the industrial product, so as to allow its correct positioning during pick-up and transport operations. More preferably, abutment element 34 is supported by at least one retractable fork 32. Even more preferably, abutment element is supported by at least one end segment 32*b*. In the embodiment shown, at least one end segment 32*b* is provided with a plurality of abutment elements 34, which are used to correctly position or center the industrial product on retractable forks 32. For example, in case of an industrial product including a jig and an aeronautical semifinished product, abutment elements 34 can be coupled to corresponding engagement organs supported by the jig itself.

Preferably, the abutment elements comprise a plurality of projections or truncated cone-shaped pins 34 and the engagement organs comprise a plurality of seats (not shown), which are adapted to receive said projections 34.

Preferably, transport assembly 28 comprises a proximity sensor apparatus 36, which is suited to provide a signal indicating the presence of obstacles in the direction in which said transport assembly 28 is able to pick up and/or deliver said industrial product. More preferably, pick-and-place assembly 32 is provided with said proximity sensor apparatus 36, which, therefore, is suited to provide a signal indicating the presence of obstacles in the transverse movement and transportation direction of pick-and-place assembly 32. Based on said signal, the moving system allows or inhibits the movement of transport assembly 28 and, in particular, of pick-and-place assembly 32 according to predetermined operating modes. For example, if proximity sensor apparatus 36 detects the presence of objects or people located in the transverse movement and transportation direction of pick-and-place assembly 32, moving system 16 inhibits its activation.

In particular, at least one of forks 32 supports proximity sensor apparatus 36, which is suited to provide a signal indicating the presence of obstacles in the extension direction of fork 32; in the embodiment shown, the proximity sensor apparatus comprises at least one pair of sensors 36, which are arranged on longitudinally opposite sides of fork 32. Advantageously but not necessarily, sensors 36 are arranged on longitudinally opposite sides of segment 32*b*.

In the embodiment shown, when pick-and-place assembly 32 holds or supports the industrial product in order to move it between one of the first operating stations 12 and one of the second operating stations 14, said pick-and-place assembly 32 is adapted to move along passage 24 during the transportation between working surfaces or platforms 18 and 20. In this way, the handling of the industrial product is performed with minimal and optimized movements, so that bulky and heavy industrial products, such as the industrial products of the aeronautical field, can be easily handled.

With reference in particular to FIG. 2, each operating station 12, 14 is associated with a safety barrier 38, which is suited to assume an active condition or position and an inactive condition or position. In the active condition or position, safety barrier 38 prevents moving system 16 from accessing respective operating station 12, 14, for example by separating respective operating station 12, 14 from transport assembly 28 and, in particular, from pick-and-place assembly 32. On the other hand, in the inactive condition or position, safety barrier allows said moving system 16 to access respective operating station 12, 14, for example by allowing pick-and-place assembly 32 to move towards respective operating station 12, 14.

In the embodiment shown, safety barrier 38 comprises an obstacle of the physical type, which is adapted to be interposed in the space arranged between moving system 16, especially pick-and-place assembly 32, and respective operating station 12, 14, when said safety barrier 38 is in the active position, and, respectively, to free the space arranged between moving system 16, especially pick-and-place assembly 32, and respective operating station 12, 14, when said safety barrier 38 is in the inactive position.

Alternatively, the safety barrier can be conceived as a "virtual" barrier, such as an electronic safety barrier (typically of the optoelectronic type). According to this embodiment, said virtual safety barrier is able to interact with moving system 16, in particular with pick-and-place assembly 32, without physical interposition, but—for example—by means of automatic control logics and/or with the use of sensors. According to a possible embodiment, said "virtual" safety barrier can be programmed to:—prevent moving system 16 (in particular pick-and-place assembly 32) from accessing respective operating station 12, 14, when said barrier is in the active condition; and—allow moving system 16 (in particular pick-and-place assembly 32) to access respective operating station 12, 14, when said barrier is in the inactive condition.

Preferably, the safety barrier comprises a shutter 38, which is arranged between respective operating station 12, 14 and the area to which transport assembly 28, especially by pick-and-place assembly 32, is able to approach. In the active position shutter 38 is lowered, whereas in the inactive position it is lifted. The movement between the active position and the inactive position of safety barrier can be motorized, for example it can be manually controlled by the operators assigned to respective operating station 12, 14 or automatically controlled according to predetermined modes. In the embodiment shown, each shutter 38 is supported by base platform 18 or by higher platform 20, based on whether it protects one of the first operating stations 12 or one of the second operating stations 14. By way of example, shutter 38 can be supported by a structure substantially having the shape of a portal and delimited by a pair of lateral uprights 40 projecting from platform 18 or 20, between which a winding organ (not numbered) extends, around which shutter 38 can be wound when it is lifted towards the inactive position and unwound when it is lowered towards the active position.

Preferably, with reference in particular to FIG. 3, plant 10 comprises a central control system 42, which is suited to control operating stations 12 and 14 and/or moving system 16.

In particular, control system 42 is configured to control at least moving system 16 by automatically moving the industrial product between the operating stations as a function of a predetermined principle and based on the state of occupancy of the operating stations 12, 14. For example, control system 42 can be configured so as to control moving system 16 in such a way that it automatically transports (without the need for a human operator to intervene giving manual commands to moving system 16) the industrial product from a departure operating station 12, 14 to an arrival operating station 12, 14 as a function of a so-called predetermined production "takt time" corresponding to the respective production activity that departure operating station 12, 14 is suited to perform.

As a person skilled in the art can clearly understand, the term "takt time" generally identifies the industrial product production time that is sufficient to cover the demand for the industrial product requested. In other words, the takt time substantially is "the productive speed or rate" with which the industrial product has to be manufactured in order to satisfy the demand for the industrial product within the desired amount of time. In this case, once a takt time associated with the working process for the industrial product has been determined, a respective takt time is established for each production activity.

In particular, at the end of the takt time of a production or assembling activity, moving system 16 automatically moves the industrial product from departure operating station 12, 14 (associated with the production activity) to arrival operating station 14 (associated with the production activity that has to be performed next in the processing sequence).

In the embodiment shown, plant 10 comprises, furthermore, a memory system 44 (preferably a remote one), which is connected to central control system 42 and is suited to store data representing the production activities being carried out or carried out on the industrial product by operating stations 12 and 14 or by moving system 16 or by both. Thanks to these features, all the production activities involved in the manufacturing process of the industrial product can be tracked down.

In the embodiment shown, central control system 42 is provided with a dedicated data processing (sub)network, which is connected to operating stations 12 and 14 and/or to moving system 16 and, furthermore, communicates with a LAN network so as to store (perform a back-up of) all the representing items of information mentioned above.

For example, central control system 42 can be suited to control the movement of transport assembly 28 of moving system 16 based on the signals provided by sensor apparatus 36. In particular, central control system 34 is able to inhibit and enable an undesired extension of forks 32, when sensors 36 detects that safety barrier 38 respectively is in the active position, thus providing an inhibition signal, and in the inactive position, thus providing an enabling signal. In the embodiment shown, the movement of forks 32 is inhibited and enabled when shutter 38 is respectively lowered and lifted.

Now we will describe a method to produce an industrial product according to an explanatory embodiment of the present invention. By way of example, the method will be described with reference to plant 10 shown in the figures. Though, as a person skilled in the art can clearly understand, this method can also be used in different plants.

The method comprises a plurality of production activities, which are performed on the industrial product in operating stations 12 and 14. During this method, the industrial product is transported between operating stations 12 and 14, which are arranged at different levels or heights H1, H2, by means of a moving system, for example by means of moving system 16.

During this method, the moving system slides in a guided manner between operating stations 12 and 14. In the embodiment described, moving system 16 slides between the first rows of operating stations 12 and the second rows of the operating stations 14, for example through the guide rail.

Let's consider the case in which a first "departure" operating station 12 has ended a previous production activity to be performed on the industrial product and the latter has to be subject to a following production activity that has to be performed by a second "destination" operating station 14, which is arranged in a higher position with respect to the first operating station 12.

During a first step, moving system 16 is moved, in a guided manner, between the first operating stations 12, until it is in correspondence to the first "departure" operating station 12. In case moving system 16 already is in correspondence to the first "departure" operating station 12, this step can clearly be left out.

In the embodiment described, the moving system is moved between said pair of rows of first operating stations 12. Preferably, in this first step, the movement of moving system 16 is performed by causing its support structure 26 to slide on the guide rail. In the embodiment described, the top part of support structure 26 also slides within passage 24 arranged between the second pair of rows of the second operating stations 14.

Simultaneously with the movement described above, moving system 16 places itself so as to cause transport assembly 28 to be arranged in correspondence to height H1 of the first "departure" operating station 12. In the embodiment described, transport assembly 28 is moved in a guided manner through passage 24, for example on the uprights 27, so as to reach height H1 of the first "departure" operating station 12. If transport assembly 28 already is at height H1 of the first "departure" operating station 12, this step can clearly be left out.

Therefore, in this first step, there advantageously is a sliding translation of support structure 26 on the guide rail and, simultaneously, a vertical translation of support assembly 27 on support structure 26.

In a second step, moving system 16 picks up, from the first "departure" operating station 12, the industrial product to be transported to the second "destination" operating station 14. Preferably, if sensor apparatus 36 does not detect obstacles and safety barrier 38 associated with the first "departure" operating station 12 is in the inactive position, pick-and-place assembly 32 shifts from a retracted position, in which is does not transversely project beyond support element 30 (hence, beyond support structure 26), to an extended condition, in which it transversely projects with respect to support element 30 (hence, with respect to support structure 26) and is adapted to pick up the industrial product. In this last case, pick-and-place assembly 32 is arranged under the industrial product to be lifted and supported during transportation. Preferably, abutment elements 34 are housed in corresponding recesses created in the bottom of the industrial product (for example in the bottom of the jig). After the industrial product has been successfully picked up, pick-and-place assembly 32 goes back to the retracted position, dragging the industrial product inside support structure 26.

During a third step, moving system 16 is moved, in a guided manner, between the second operating stations 14, until it is in correspondence to the second "destination" operating station 14.

In the embodiment described, moving system 16 is moved between said pair of rows of second operating stations 14. Preferably, in this third step, the movement of moving system 16 is performed again by causing support structure 26 to slide on the guide rail. In the embodiment described, support structure 26 also slides within passage 24 arranged between the pair of rows of the second operating stations 14. If the top part of support structure 26 already is in correspondence to the second "destination" operating station 14, this step can clearly be left out.

Simultaneously with the movement described above, transport assembly 28 places itself so as to be arranged in correspondence to height H2 of the second "destination" operating station 14 In the embodiment described, transport assembly 28 is moved in a guided manner, for example on uprights 27, so as to reach height H2 of the second "destination" operating station 14.

Therefore, in this third step, similarly to the first step, there advantageously is a sliding translation of support structure 26 on the guide rail and, simultaneously, a vertical translation of transport assembly 28 on support structure 26.

In a fourth step, moving system 16 delivers the industrial product to the second "destination" operating station 14. Preferably, if sensor apparatus 36 does not detect obstacles and safety barrier 38 associated with the second "destination" operating station 14 is in the inactive position, pick-and-place assembly 32 shifts from the retracted position to the extended condition, thus bringing the industrial product beyond the support structure 26. When the industrial product is decoupled from pick-and-place assembly 32, for example by removing it from abutment elements 34, it is delivered to the second "destination" operating station 14. Subsequently, pick-and-place assembly 32 goes back to the retracted position.

Now the second "destination" operating station 14 is able to perform the following production activity, for which it is suited, on the industrial product.

For the sake of brevity, we have only described the movement of an industrial product from a first "departure" operating station 12, which is arranged in a lower position, to a second "destination" operating station 14, which is arranged in a higher position. Though, as a person skilled in the art can clearly understand, the roles of operating stations 12 and 14 can be switched; in this case, one can apply the same steps of the method described above, but they have to be performed in a reverse manner (for example by lifting instead of lowering and vice versa).

According to the present invention, the manufacturing method can be more flexible and, therefore, it can be adjusted to possible variations of the production volumes.

As a matter of fact, the production activities to which the industrial product is suited to be subject can be planned and updated in real time while the method is being performed, for example by central control system 34, based on a scheduling determined as a function of the occupation of operating stations 12, 14. In this way, moving system 36 is able to move the industrial product to an operating station 12, 14 suited to perform a production activity according to a predetermined control logic or algorithm, which is conceived so as to optimize the overall time needed by the industrial products to move through plant 10.

Therefore, one can use a progressive matching principle, in which, during the process, each industrial product is destined to be transported to a free "destination" operating station 12, 14 (namely one that is not occupied by another industrial product being processed) and to be associated with a production activity that still has to be performed on the industrial product itself. In this way, the drawbacks caused by machine standstill can be reduced, since the sequence of the production activities can be redefined each time in real time according to bonds among the production activities and according to the occupation states of operating stations 12, 14.

Furthermore, the reduced occupation of the spaces guaranteed by the present invention allows users to obtain, in plant 10, further areas for "parking" operating stations, where the industrial product can be left and wait between two consecutive operating activities, for example in order to complete the operations for the polymerization of the industrial product.

Furthermore, the use of moving system 16 is advantageous also because it guarantees high standards or working ergonomics. As a matter of fact, it can be configured so as to facilitate the industrial product pick-up and delivery operations in single operating stations 12, 14. For example, the industrial product can be rotated and lifted/lowered in a controlled and "customized" manner as a function of commands given by the operator when pick-and-place assembly 32 is close to operating station 12, 14 involved in the pick-up or delivery operations.

Naturally, the principle of the present invention being set forth, the embodiments and the implementation details can be widely changed with respect to what described above and shown in the drawings as a mere way of non-limiting example, without in this way going beyond the scope of protection provided by the accompanying claims.

Furthermore, the plant can also be built on a larger number of levels defined by platforms 18, 20. Furthermore, plant 10 can comprise more than two rows defined by the first operating stations 12 and by the second operating stations 14; in this case, it is preferable to use a plurality of moving system 16 to handle the industrial products and, if necessary, a corresponding plurality of passages or corridors 24.

The invention claimed is:

1. An industrial plant for production of an industrial product associated to a working process, said working process including a plurality of predetermined production activities; at least one of said production activities including a: manufacturing, processing, forming, transforming and assembling activity of said industrial product;
    said plant comprising:
    a plurality of first operating stations and at least a plurality of second operating stations, the plurality of first operating stations are placed at a first level or height and the plurality of second operating stations are placed at at least at one second level or height, which said second level or height is higher than said first level; each one of said operating stations is arranged to carry out at least one production activity on said industrial product;
    at least one moving system configured to transport said industrial product by lifting and/or lowering said industrial product between at least one of said first operating stations and at least one of said second operating stations; and
    a central control system controlling at least one said moving system by automatically moving said industrial product between said operating stations as a function of a predetermined principle and based on a state of occupancy of said operating stations;
    wherein said moving system is a stacker crane comprising:
    a support structure which is movable between said operating stations, and
    a transport assembly that is vertically slidable in a guided manner between said first level and said second level on said support structure and is arranged to pick up said industrial product and move said industrial product from at least one of said first operating stations to at least one of said second operating stations;
    said transport assembly comprising:
        a support element arranged to move vertically in a guided manner on the support structure and
        a pick-and-place assembly movable in a guided manner on said support element, the pick-and-place assembly is able to extend and project from said support element in a direction substantially transverse to the vertical direction, and the pick-and-place assembly is arranged to pick up and move said industrial product;
        a proximity sensor apparatus conveyed by said pick-and-place assembly and arranged to provide a signal indicating a presence of obstacles in the transverse movement and transportation direction of the pick-and-place assembly, said transport assembly is able to:
    pick up said industrial product from a departure operating station, and/or deliver said industrial product to an arrival operating station;
    wherein at least one of said operating stations is associated with a safety barrier, and wherein said safety barrier is arranged to assume:
        an active condition or position wherein said barrier prevents said moving system from accessing the respective operating station, and
        an inactive condition or position wherein said barrier allows said moving system to access the respective operating station;
    wherein based on said signal from said proximity sensor apparatus, said central control system is configured to:
    allow movement of the pick-and-place assembly when said proximity sensor apparatus detects that the associated safety barrier is in the inactive position, and provide an enabling signal, and
    inhibit movement of the pick-and-place assembly when said sensor apparatus detects that the associated safety barrier is in the active position, and provide an inhibition signal.

2. A plant according to claim 1, wherein said control system is configured to control said moving system in such a way that said moving system automatically transports said industrial product from a departure operating station to an arrival operating station as a function of a predetermined production time corresponding to the respective production activity that the departure operating station is suited to perform.

3. A plant according to claim 1 further comprising, a memory system that is connected to said central control system; said memory system is arranged to store data representing the production activities being carried out on said industrial product by said operating stations and/or by said moving system.

4. A plant according to claim 3, comprising a data processing network, said data processing network is connected to said operating stations and/or to said moving system.

5. A plant according to claim 4, wherein said data processing network communicates with a LAN network that is configured to store said representing data in said memory system located in a remote position with respect to the central control system.

6. A plant according to claim 1, wherein said safety barrier is a virtual obstacle that is able to interact with the moving system without physical interposition.

7. A plant according to claim 6, wherein said central control system is adapted to control the movement of the moving system based on the signals provided by the sensor apparatus.

8. A plant according to claim 1, wherein said safety barrier is a physical obstacle that is interposed in a space arranged between the moving system and the respective operating station when said safety barrier is in the active position, and outside of the space arranged between the moving system and the respective operating station when said safety barrier is in the inactive position.

9. A plant according to claim 8, wherein said safety barrier comprises a shutter, wherein said shutter is arranged between the respective operating station and an area where the moving system approaches; said shutter is lowered in the active condition, and lifted in the inactive condition.

10. A plant according to claim 1, wherein said control system is adapted to calculate and update in real time by scheduling a production activity sequence to perform the production activities associated with said working process as a function of said predetermined principle and said conditions of said operating stations.

11. A plant according to claim 1, wherein said pick-and-place assembly is extendable in two directions on opposite sides of said support element in order to be able to pick up and/or place said industrial product on one side or on an other side of said support element.

12. A plant according to claim 1, wherein said pick-and-place assembly comprises a plurality of forks that extend and project from said support element in order to pick up and place said industrial product.

13. A plant according to claim 1, wherein said pick-and-place assembly is provided with at least one abutment element that is coupled to a seat obtained in a support framework for housing said industrial product, in order to allow correct positioning of the pick-and-place assembly during pick-up and transport operations.

14. A plant according to claim 13, wherein said support framework is a jig for firmly receiving said industrial product during the execution of the working process through said operating stations.

15. A plant according to claim 1, comprising:
a base working surface placed at said first level, wherein said base working surface supports said first operating stations; and
at least one higher working surface placed at said at least one second level, said higher working surface supports said second operating stations.

16. A plant according to claim 15, further comprising a space through which said moving system passes that is next to said second operating stations, wherein said space is placed close to said at least one higher working surface.

17. A plant according to claim 1, further comprising at least one jig for firmly receiving said industrial product during execution of the working process and the picking up of the industrial product by said moving system through said operating stations.

18. A method for producing an industrial product, comprising:
a plurality of production activities, at least one of the activities including a manufacturing, processing, forming, transforming and assembling activity, wherein said activity is carried out on said industrial product in a plurality of first operating stations and at least a plurality of second operating stations;
wherein said plurality of first operating stations and said at least a plurality of second operating stations are respectively placed at a first level or height and at at least one second level or height, said second level or height is higher than said first level;
wherein said industrial product is transported between consecutive production activities by lifting and/or lowering said industrial product from at least one of said first operating stations to at least one of said second operating stations;
said method comprising the step of automatically moving said industrial product between said operating stations as a function of a predetermined principle and the state of occupancy of said operating stations;
wherein said method is carried out by actuating an industrial plant according to claim 1.

* * * * *